B. SCHILLING.
AUTOMATIC FARM LIGHTING AND POWER SET.
APPLICATION FILED FEB. 9, 1920.
1,377,223.
Patented May 10, 1921.
2 SHEETS—SHEET 1.
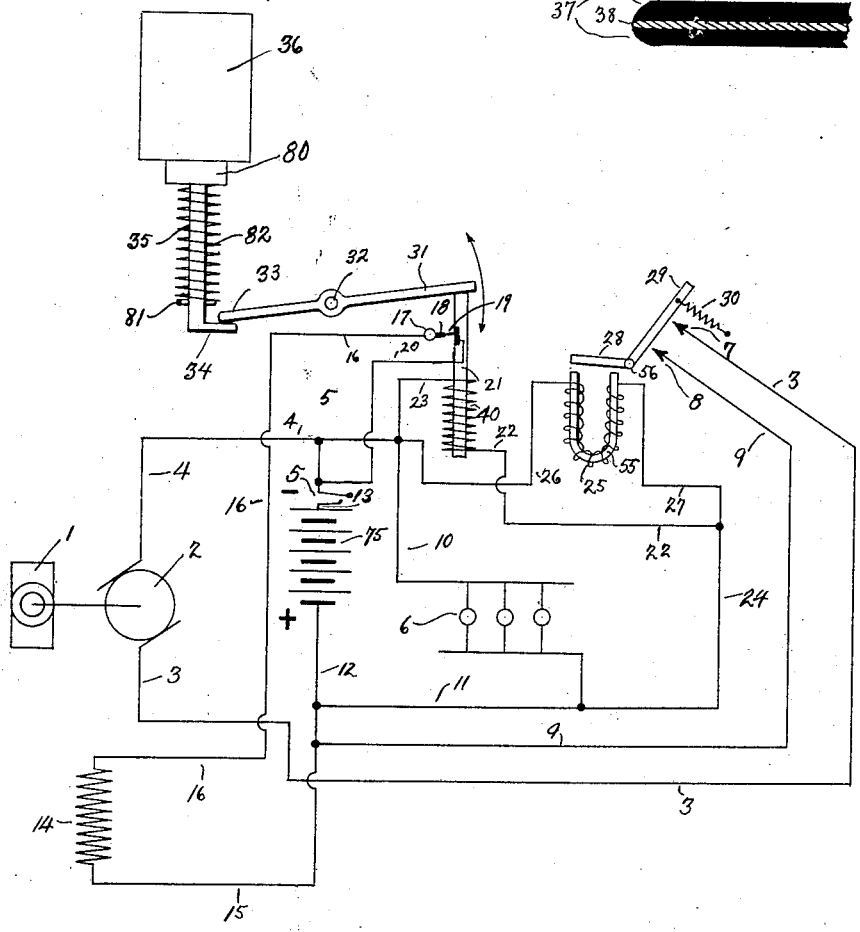
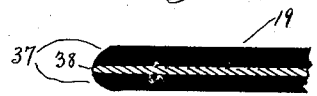
Inventor
Bernhard Schilling
By his Attorney
Frank Ledeman B. SCHILLING.
AUTOMATIC FARM LIGHTING AND POWER SET.
APPLICATION FILED FEB. 9, 1920.
1,377,223.
Patented May 10, 1921.
2 SHEETS—SHEET 2.
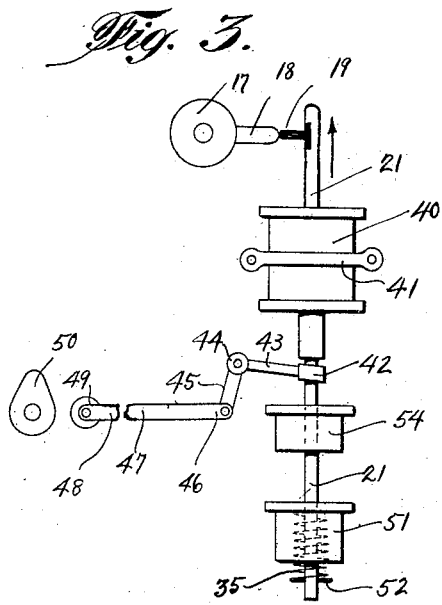
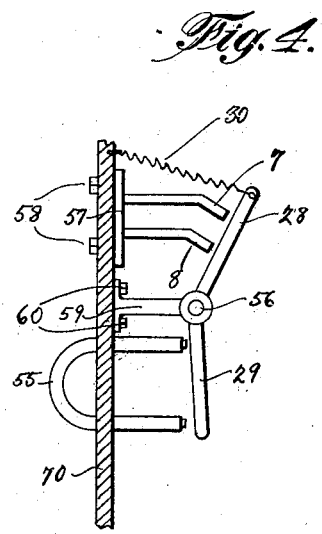
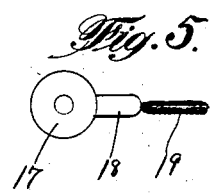
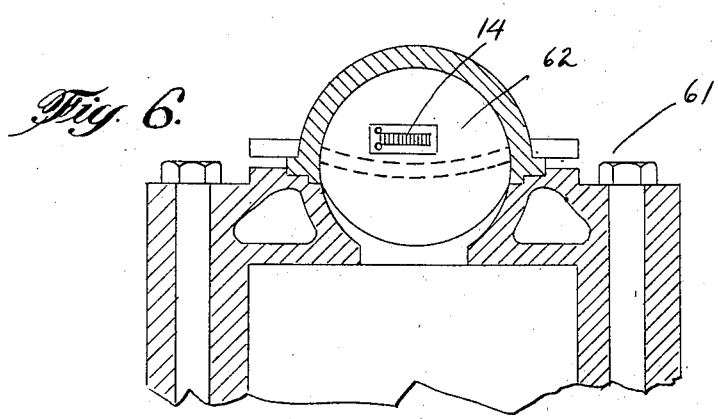
Inventor
Bernhard Schilling
By his Attorney
Frank Lederman

UNITED STATES PATENT OFFICE.

BERNHARD SCHILLING, OF PATERSON, NEW JERSEY.

AUTOMATIC FARM LIGHTING AND POWER SET.

1,377,223.　　　　　Specification of Letters Patent.　　Patented May 10, 1921.

Application filed February 9, 1920. Serial No. 357,396.

*To all whom it may concern:*

Be it known that I, BERNHARD SCHILLING, citizen of Germany, and resident of Paterson, in the county of Middlesex and State of New Jersey, have invented certain new and useful Improvements in Automatic Farm Lighting and Power Sets, of which the following is a specification.

This invention relates generally to farm lighting and power sets, but it may well be used for other than farm and farm house needs, as will become apparent in the following description.

The main object of the invention is to provide an automatic, self-regulating electric power set, comprising primarily a set of storage cells which supply the load current at all times excepting while they are being charged; a dynamo for charging said cells, or battery, as they will be called in this description; a two-cycle crude-oil engine for rotating said dynamo for charging said battery; and automatically controlled devices for keeping the battery charged and at all times prepared to take on all of or any part of the load for which it is designed.

Although I have mentioned a crude-oil engine as my source of power, I do not desire to limit myself to crude-oil as a fuel, as there are other practical fuels which may be used to drive my dynamo; however, I prefer crude-oil because of its great economy compared to the other fuels in common use.

The above and other objects will become apparent in the description below, in which characters of reference refer to like-named parts in the drawings, in which, briefly, Figure 1 represents the method of wiring my device and the electrical arrangement of parts, the elements thereof being shown but diagrammatically.

Fig. 2 is an enlarged view of the solenoid contact 19, the description whereof will be found below.

Fig. 3 is a view showing my means for controlling the oil engine automatically.

Fig. 4 is a view showing my electric control for the dynamo.

Fig. 5 is a view illustrating the automatic contact of the solenoid.

Fig. 6 is a typical view of the head of the explosion chamber of a two cycle engine, showing the manner of placing my ignition coil therein.

Referring now in detail to the drawings, the numeral 1 represents diagrammatically a prime mover, in this case, my two cycle oil engine, and the numeral 2 similarly represents the dynamo driven thereby, either direct connected, or otherwise. The wires leading from said dynamo are indicated by the numerals 3 and 4, the latter leading to a switch 5 and to a battery of storage cells 75 through the wire 13, while the former leads directly to one contact 7 of the dynamo control armature 28. Said armature is of substantially the form shown, being pivoted at 56 and having an extension 29 of conducting material such as copper. A spring 30 tends normally to withdraw said armature from the electromagnet 55. The other contact 8 of said armature 28 leads through the wire 9 to the wire 15, thence through the wire 12 to the opposite terminal of the battery 75.

Said electromagnet 55 has one terminal connected to the wire 27, and therefrom the circuit continues through the wire 24, the wire 11, the wire 12, and to the battery 75. The other terminal of said electromagnet leads to the wire 26, switch 5, and wire 13 to the other terminal of the battery 75. Thus said electromagnet is, at all times when the switch 5 is closed, in parallel with, or "across" the battery 75.

The numeral 40 represents a solenoid having a core 21 vertically slidable therein. One terminal of said solenoid is connected to a wire 23, and thence through the switch 5 and wire 13 to the battery 75. The other terminal of said solenoid is connected to a wire 22, and thence through the wires 24, 11, and 12 to the other battery terminal. Thus the solenoid, too, is, at all times when the switch 5 is closed, "across" the battery 75. The load is indicated at 6, connected to one terminal of the battery through the wires 10, switch 5, and wire 13, and to the other terminal through the wires 11 and 12.

As indicated in Fig. 6, an ignition coil of resistance wire, 14, which is adapted to be heated to a red heat by current from the battery, is placed in the ignition chamber, inside the common "hot ball" 62 of the two cycle engine whose head end is generally represented by the numeral 62. As shown in the diagram, Fig. 1, this coil is connected on one side to the battery through the wires 16, terminal 17, contact 18, contact 19 on the solenoid plunger 21, wire 20, switch 5, and wire 13.

The solenoid 40 is to be attached to a convenient switchboard, as is also the magnet 55 and its armature and contacts. In Fig. 1 I have shown diagrammatically the means by which the action of the solenoid 40 controls the operation of the driving engine 1. The numeral 36 here diagrammatically represents a jacket support in which the fuel pump attached to the rod 35 (but not shown here) is slidably mounted. A collar 80 is shown on said jacket 36, and the rod 35 is provided with an outstanding end 34. A collar 81 is rigid to said rod 35, and a coiled spring 82 is shown between said collars 81 and 80 so as to normally keep said rod in its innermost position in the jacket 36. A simple lever is pivoted at 32 and one end 33 rests against the end 34 of the rod 35, while the other end of said lever rests upon the top end of the plunger 21. The above described mechanism for the engine control is used only for the diagrammatic representation, while in practice any desired linkage may be used whereby vertical motion of the solenoid plunger 21 will cause longitudinal motion of the fuel pump of the engine, the intention being to cause said pump to be withdrawn from its operating cam when the battery is fully charged, and to allow the pump to return toward said cam to again operate the pump when the batteries are in need of charging. One manner of practical operation is indicated in Fig. 3, there being a collar 42 attached to the plunger 21, and an L-shaped lever 43—45 being pivoted on the switchboard at 44, as shown, its end 45 being connected to a link 47 at 46. Now any desired additional linkage may be interposed between the member 47 and the roller 49 which is attached by the rod 48 to the fuel pump, not shown. It is well known that in common types of two cycle engines the operation of the engine is dependent upon the synchronous operation of the fuel pump, by a cam which I have represented at 50, this cam being rotated by the engine fly wheel. Now if the roller 49, which is, in operation of said engine, given a reciprocal motion by the cam 50, is withdrawn from engagement with said cam, the engine will promptly be brought to a stop. This is the principle which I have presented, and it is apparent that (Fig. 3) upon upward movement of the plunger 21 the roller 49, and hence the fuel pump, will be withdrawn from engagement with said cam. In the embodiment which I have illustrated in Fig. 3 I have, first, the solenoid 40 secured to the switchboard by a brace 41. This plunger 21 extends some distance below the solenoid coil, through a dash pot 54 whose function is to minimize the speed of motion of the plunger 21 in either direction, and also through a casing 51 in which a spring 35 is coiled about said plunger between a collar 52 on the latter and the top of said casing, the function of said spring being to normally urge said plunger downward.

A contact 19 extends from the upper portion of said plunger, and is composed of a central member of copper or other conductor, surounded by a shell of insulating material 37. The end of the conductor 38 is free, and it is adapted to make contact with the contact 18 extending from the post 17 on the switchboard.

The construction of my electromagnet contacts is indicated in Fig. 4, which shows the magnet 55 secured to the switchboard panel 70, and the armature 28—29 pivotally mounted at 56 upon a bracket 59 secured by bolts 60 to said panel. Contact fingers 7 and 8 are also secured to said panel, by bolts 58 and a base 57. A spring 30 normally urges said armature to close the circuit between said contacts 7 and 8.

The complete operation of my set will now be described, with particular reference to Fig. 1. Assuming, first, that the batteries are at full charge, say 32 volts, and the load 6 is applied by closing the switch 5. This last operation also throws in the solenoid 40 and the magnet 55 "across" the battery 75. Thus the current through the solenoid causes the plunger 21 to rise to its full height, since the battery is at its maximum voltage, and this rise of the solenoid plunger causes the fuel pump to be withdrawn from actuation by the cam 50. Of course, before the load was thrown on, the engine and dynamo were idle, and armature 28—29 was in position to bridge the fingers 7—8. The magnet 55 is at the same time actuated to draw the end 28 of the armature downward, so as to open the contacts 7—8. It is thus apparent that the battery 75 will supply current through the load 6 without disturbance. After the energy of the battery has been lessened by the continued absorption in the load, the battery voltage will drop, and since the vertical position of the plunger 21 will be proportional to the voltage of the battery, the said plunger will fall. Now, owing to the dash pot 54 the plunger will fall slowly, said dash pot acting as a balance to lessen the force of the spring 35. The tension of the spring 35 is such that the plunger 21 will fall to its lowermost position when the voltage has fallen, say, to 30 volts, at which position the contact 19 will engage the contact 18, causing current to flow through the coil 14, which will then glow to a red head. The electromagnet 55 is designed so that it will release the armature 28 when the voltage of the battery has fallen to the same extent, that is, to 30 volts, thereby causing the closing of the bridge between the fingers 7—8. While the plunger 21 has been falling, the roller 49 has been approaching the cam 50, and when the plunger reached its lowermost position said roller was in position to be actuated by said cam. Now it is apparent that, when the voltage has thus fallen to 30 volts, the battery 75 will send current into the dynamo 2, causing it to rotate and thus turn the engine 1. Since the engine has been idle, its "hot ball" is cold, but instead the coil 14, located in said hot ball, is red hot and will ignite the fuel injected by the fuel pump. Thus, after the engine has been given its initial start by the dynamo, it will run of its own accord and drive the dynamo, causing a charging of the battery 75. At the start of the charging, the battery voltage will be relatively low and the charging current heavy, but the voltage will increase as the charging continues. However, as soon as the voltage has been raised even a trifle, the solenoid plunger 21 will commence to rise, thus breaking the contact between the members 18 and 19. The design is such that this contact will be opened after the engine has made a very few turns on its own power, for then the "hot ball" will have been heated sufficiently to cause further ignition of the fuel, and the heat of the coil 14 will no longer be required. When the battery voltage has thus been again raised to normal the magnet 55 will draw in its armature 28 and thus open the bridge between the fingers 7—8; this opens the circuit between the dynamo and the battery; at the same time the solenoid plunger 21 is raised to its topmost position, and the fuel pump is disengaged from actuation by the engine cam 50. Hence both the engine and the generator resume their idleness. This cycle of events is repeated again when the battery voltage is again reduced, as above described.

Thus I have provided a completed automatic electric power set, whose use will be most appreciated on farms and where small sets, not requiring the services of an operator, are desirable.

I claim:

1. An automatic electric power set comprising, in combination with a two-cycle oil engine and a dynamo connected thereto, and a storage battery, means for starting said engine when the battery voltage has fallen to a given degree so as to drive said dynamo to charge said battery, said means consisting of an electromagnet, a switch in series with said battery, said electromagnet bridged across said battery and switch, a solenoid bridged across said switch and battery, an armature subject to actuation by said electromagnet, contacts adapted to be closed or opened by said armature, said contacts being interposed in electrical circuit between said dynamo and said battery, a heat ignition coil located in the combustion chamber of said engine, a plunger adapted to be moved longitudinally by said solenoid, contacts adapted to be closed or opened by said solenoid plunger said last named contacts being in electrical series with said coil and said battery, and additional means actuated by said solenoid plunger to prevent operation of said engine by its own fuel, said last-named means being also operable to release said engine to allow operation thereof by its own fuel.

2. An automatic electric power set comprising, in combination with a two-cycle oil engine and a dynamo connected thereto, and a storage battery, means for starting said engine when the battery voltage has fallen to a given degree so as to drive said dynamo to charge said battery, said means consisting of an electromagnet, a switch in series with said battery, said electromagnet being bridged across said switch and battery, a solenoid bridged across said switch and battery, an armature subject to actuation by said electromagnet, contacts adapted to be closed or opened by said electromagnet, said contacts being interposed in electrical circuit between said dynamo and said battery, a heat ignition coil located in the combustion chamber of said engine, a plunger adapted to be moved longitudinally by said solenoid, contacts adapted to be closed or opened by said solenoid plunger, said last-named contacts being interposed in electrical circuit between said heat coil and said battery, and additional means actuated by said solenoid plunger to prevent operation of said engine by its own fuel, said last-named means being also operable to release said engine to allow operation thereof by its own fuel, said last-named means comprising a member in engagement with said solenoid plunger, a member in engagement with the fuel pump of said engine, and links between said last-named members whereby longitudinal motion of said plunger causes longitudinal motion of said pump.

Signed at New York in the county of New York and State of New York this 24th day of Jan., A, D. 1920.

BERNHARD SCHILLING.